Nov. 30, 1937.   T. L. FAWICK   2,100,312
TRANSMISSION
Filed March 13, 1935   5 Sheets-Sheet 1

Inventor:
Thomas L. Fawick.
By Brown, Jackson, Boettcher + Dienner
Attys.

Nov. 30, 1937.   T. L. FAWICK   2,100,312
TRANSMISSION
Filed March 13, 1935   5 Sheets-Sheet 2
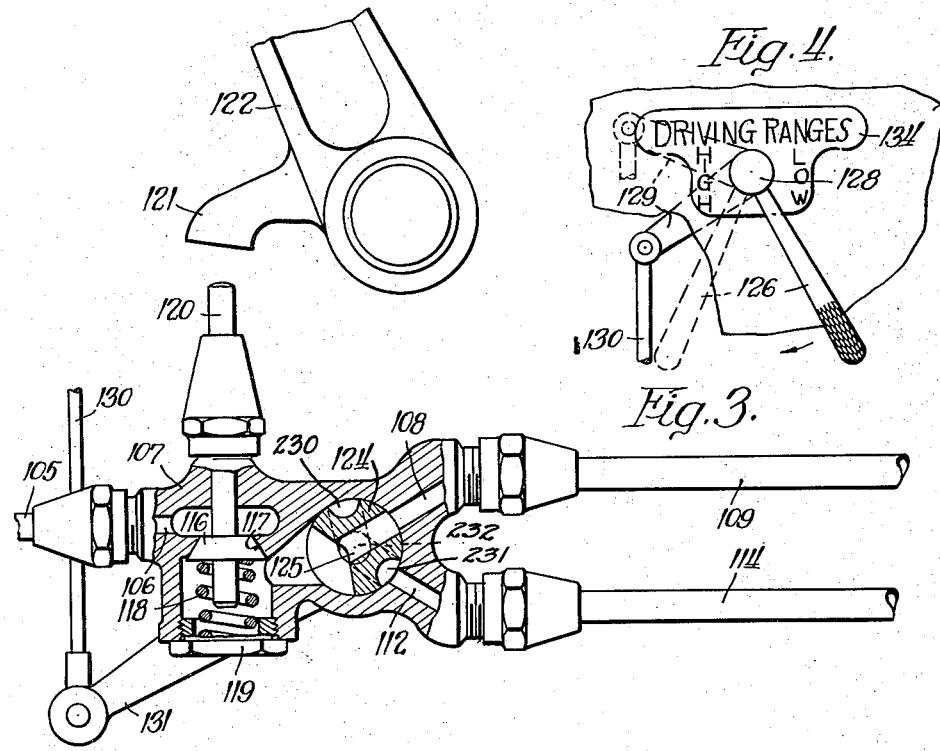
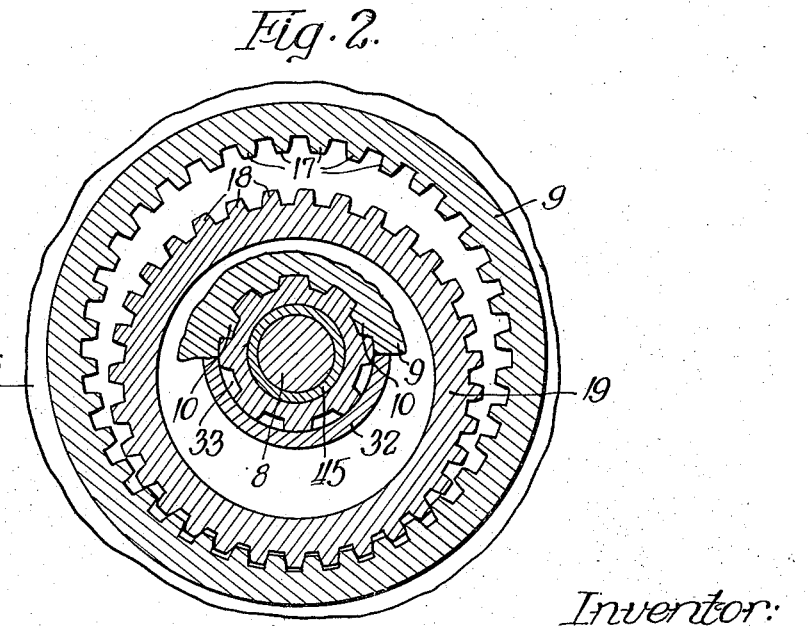
Inventor:
Thomas L. Fawick.
By Brown, Jackson, Boettcher + Dienner
Attys.

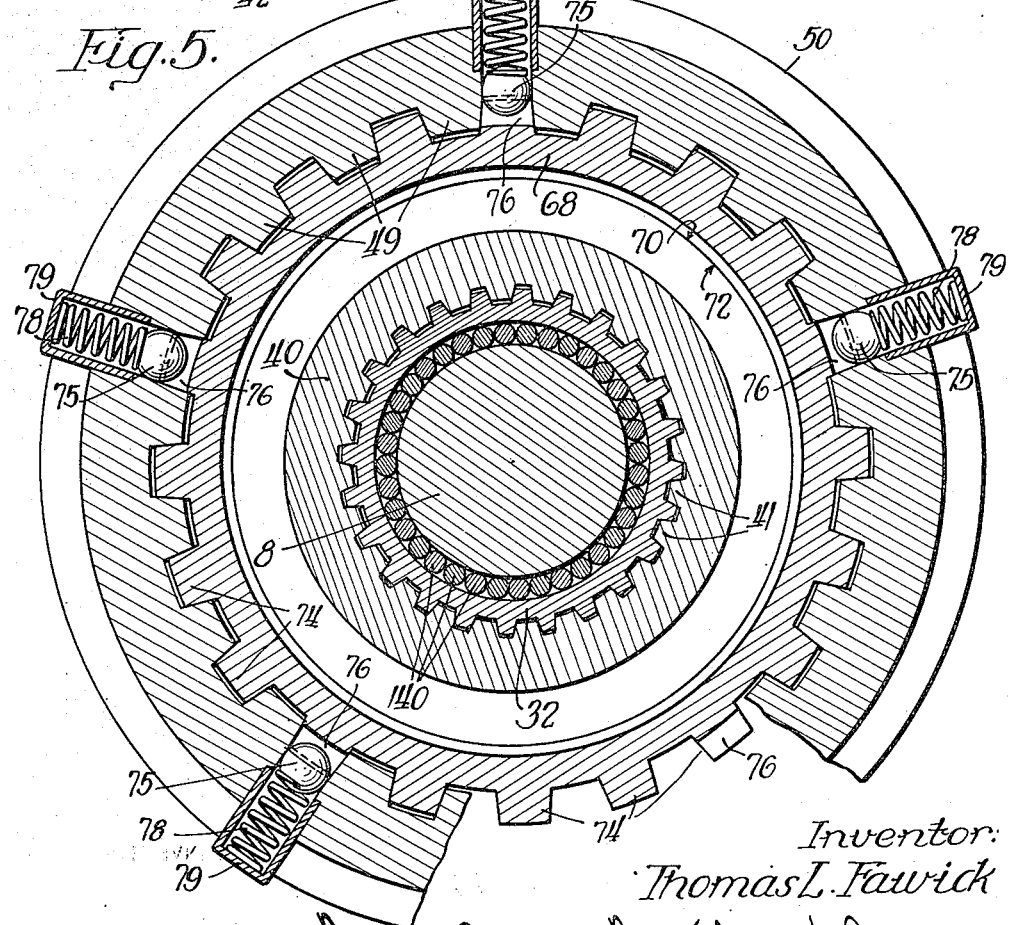

Nov. 30, 1937. T. L. FAWICK 2,100,312
TRANSMISSION
Filed March 13, 1935 5 Sheets-Sheet 4

Inventor:
Thomas L. Fawick.
By Brown, Jackson, Boettcher & Dienner
Attys.

Patented Nov. 30, 1937

2,100,312

UNITED STATES PATENT OFFICE 2,100,312

TRANSMISSION

Thomas L. Fawick, Akron, Ohio, assignor to Borg-Warner Corporation, Chicago, Ill., a corporation of Illinois Application March 13, 1935, Serial No. 10,769

14 Claims. (Cl. 74—332)

My invention relates to transmissions for automotive apparatus.

While the particular devices which I shall describe hereinafter in connection with the drawings are transmissions adapted for use in automobiles, motor busses, trucks and the like, it is to be understood that the invention is not limited to such uses but may be employed in all similar work, for example, locomotives and the like, and elsewhere as suitable or desired.

In transmitting the drive from a gasoline engine to the rear wheels or other driving wheels, it has become desirable to provide an overdrive gear device.

So far, there have been two general schemes for securing the desired overdrive—first, by means of an overdrive gear device at the rear axle, and second, by means of an overdrive device between the accelerating and reverse gear between the engine shaft and the propeller shaft.

The first scheme above mentioned has the objection of putting additional weight on the rear axle or connected parts. This results in high unsprung weight and is not desirable. The disadvantages of unsprung weight are so well known to engineers skilled in this art that no recapitulation of the same is necessary.

Furthermore in all types of overdrive devices using conventional gearing, the overdrive is obtained entirely through tooth roll. That is, if they obtained, say, 100% direct drive on the third speed, then when shifted to the fourth speed, which we will say is geared up 30%, they would have all or 130% tooth roll. In fact, the tooth roll in such a device would be the same principle as in driving in second gear in the conventional three-speed transmission. This great tooth roll makes it commercially impossible to obtain a quiet gear ratio in overdrive and, as a result, devices of this sort are noisy, with considerable wear.

My invention relates to the second class of overdrive devices; namely, to the class of devices in which the overdrive gearing is at the gear box for the accelerating and reverse gearing, or between the engine shaft and the propeller shaft where the weight is sprung weight and, consequently, least objectionable.

According to my invention, I provide, in connection with the usual accelerating and reverse gear transmission, an overdrive device consisting of an internal gear driven by an extension of the transmission shaft and a cooperating external gear member for connection with the propeller shaft. The external gear member is preferably a part of a combination external internal gear, the internal gear of which meshes with an external gear on a driven member for connection with the driven shaft of the overdrive device which, in turn, is adapted for connection with the propeller shaft of the vehicle. This gives a compound overdrive ratio in the overdrive position, but this compound character of the device may, of course, be omitted or varied within the scope of the present invention.

For every mile traveled through the internal gear overdrive, I obtain exactly the same amount of direct drive in one ratio as the other. For example, calling the direct drive 100% and having 30% overdrive in the internal gearing, the only tooth roll developed is the 30% over the direct drive. Therefore, for each mile traveled in the overdrive, the direct drive portion is exactly the same as the regular direct or third speed. This low tooth roll of the internal gear drive makes it possible to obtain an absolutely quiet gear ratio so that there is no more sound in the overdrive ratio than in direct drive. The strength of the drive is increased, and considerably more teeth are in meshing engagement at all times than with two meshing spur gears.

The lower engine speed makes the engine exceptionally quiet, and it operates with a great deal more efficiency and with a smaller amount of motor oil. By the use of this quiet operating internal gear overdrive, it has been proven in actual tests that as much as 20% more mileage has been obtained per gallon of fuel than in direct drive. Outside of the saving in fuel and motor oil, one of the main objects is to provide the reduced engine speed which results in exceptionally smooth motor car operation.

The overdrive device which I provide is compact and short in length. It is light in weight and inexpensive to manufacture, with parts of small diameter and light weight employed throughout, and it is easy to operate and has synchro-mesh means for direct and overdrive, and means for preventing shifting with the main engine clutch engaged, this latter means assuring smooth shifting operation at most any speed.

The present invention may be characterized as an improvement upon the transmission illustrated and described in my prior patent, Reissue No. 18,629, dated October 18, 1932. It employs the type of internal gearing shown and described in that patent as the overdrive device.

For the purpose of compactness and reduced overall length, the driving shaft is preferably extended through the internal overdrive gear and through the cooperating external internal gear, and reaches over adjacent a direct drive member which is disposed between a clutch part on the external internal gear and a clutch part on the driven shaft of the overdrive device and adjacent a synchronizing and clutching member for connecting the external internal gear or the direct drive driven member to the driven shaft of the overdrive device selectively as desired.

While the particular devices which I shall describe hereinafter in connection with the drawings have a single compound internal gear overdrive and direct drive, it is to be understood that the invention is not limited to the particular overdrive ratio or to the compound character thereof as shown and described.

Numerous advantages and adaptations of the invention will be apparent from the following detailed description of the preferred forms of the invention.

In order to acquaint those skilled in the art with the manner of constructing and operating certain devices in accordance with my invention, I shall now describe the illustrated embodiment of the invention in connection with the accompanying drawings, in which:

Figure 2 is a fragmentary transverse section taken on the line 2—2 of Figure 1;

Figure 3 is a fragmentary view, partially in section and partially in elevation, of a vacuum shifter mechanism suitable for use with the transmission;

Figure 4 is a view showing a control device for the vacuum shifter mechanism;

Figure 5 is a transverse section taken on the line 5—5 of Figure 1;

Figure 6 is a fragmentary detail section showing the synchronizing and clutching ring in overdrive position;

Figure 7 is a view similar to Figure 6 showing the synchronizing and clutching ring in direct drive position;

Figure 1:
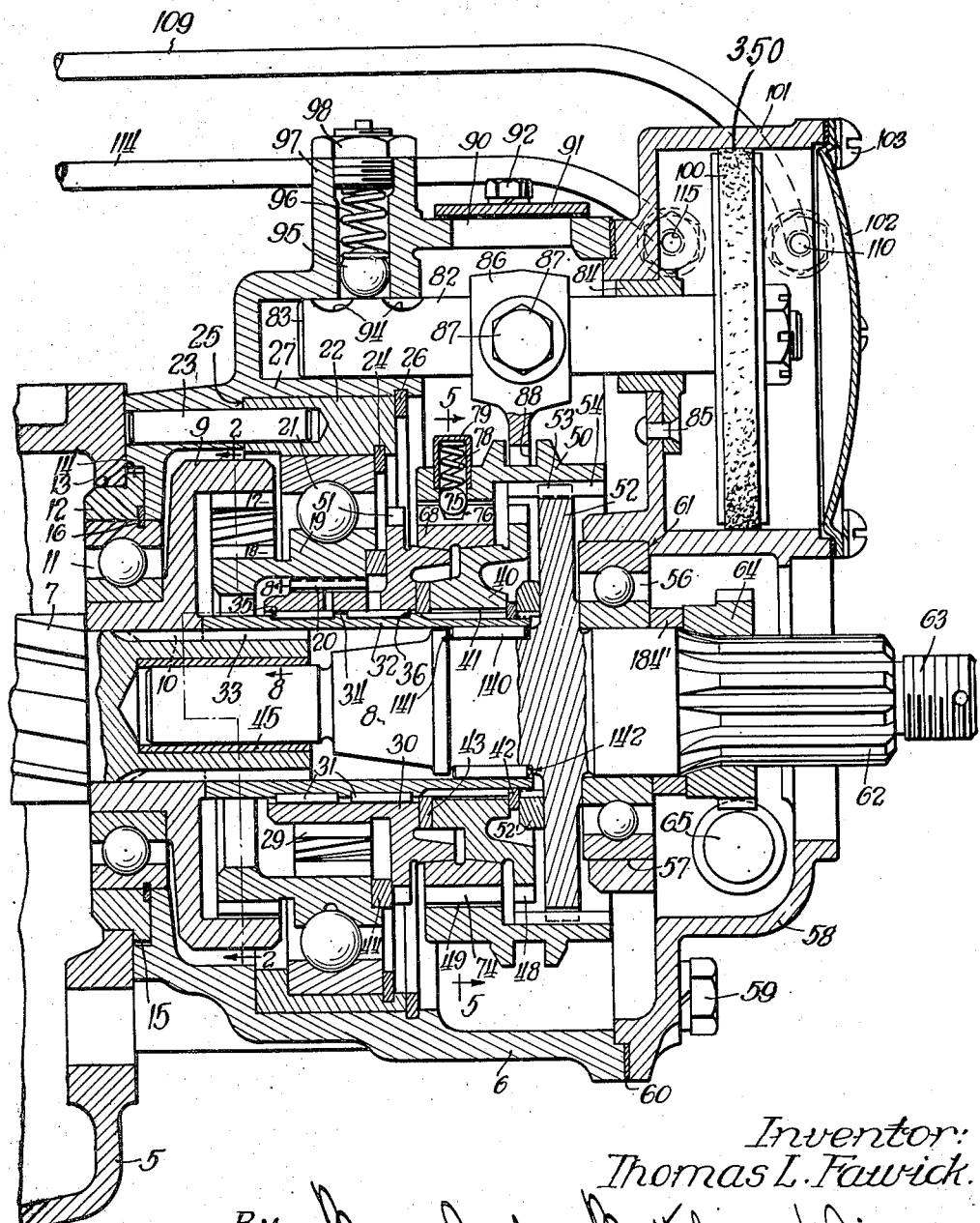
Figure 1 is a longitudinal sectional view of a transmission embodying the present invention.
Figure 8:
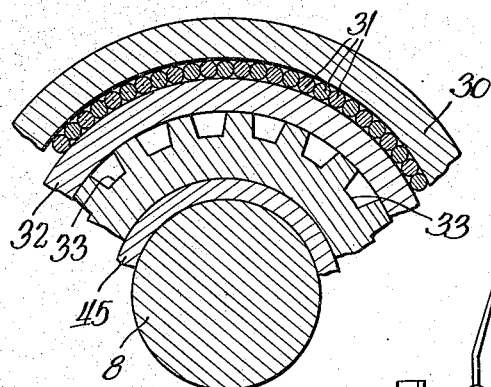
Figure 8 is a fragmentary transverse sectional view through one of the needle-point bearings taken on the line 8—8 of Figure 1.

Referring first to Figures 1 to 7, inclusive, 5 is the gear case for the usual standard type accelerating and reverse gear transmission. The accelerating and reverse transmission within the case 5 may be of any existing or preferred form.

The overdrive device is housed within a case 6 bolted or otherwise suitably secured to the case 5. The shaft 7 is the usual driven shaft of the transmission housed within the case 5. The rear end of this shaft 7 is reduced, and this reduced end projects into the case 6 and has piloted therein the reduced forward end of the driven shaft 8 of the overdrive device. An internal gear 9 is splined at 10 upon the reduced end of the shaft 7, and is supported in a bearing 11. The bearing 11 is, in turn, supported by a bearing retainer 12 held in the opening 13 in the housing 5 and prevented from endwise movement by the enlarged diameter or flange 14 clamped between the two casings 5 and 6. The end of the case 6, which abuts the case 5, is recessed at 15 to accommodate the enlarged diameter or flange 14 of the retainer 12.

The outer race of the bearing 11 is held against endwise movement by a snap ring 16 which is obtainable as standard equipment. This ring 16 is held between the retainer ring 12 and the case 6 and engages in an annular groove in the outer race of the bearing 11. The ring 16 may be split for application to the outer race of the bearing 11, and the purpose of this ring is to take the end thrust developed by the helical teeth in the internal drive.

The internal gear 9 has internal helical teeth 17 which mesh with external helical teeth 18 on an external internal or composite gear ring 19, the opposite end of which is provided with internal helical teeth 20. The external internal gear ring 19 is supported in a bearing 21 mounted in an eccentric bearing retainer ring 22. The ring 22 is held against turning by means of pins 23 which engage in registering openings in the case 6 and ring 22. The outer race of the bearing 21 is held against endwise movement to the right (Figure 1) by a retainer ring 24, and the bearing retainer 22 is held against endwise movement between a shoulder 25 on the interior of the case 6 and a retainer ring 26. The rings 24 and 26, like the ring 16, are obtainable as standard equipment and may be split for engagement in the internal groove in the retainer 22 and with the internal groove on the boss 27 on the interior of the case 6, respectively.

It is desirable, from the standpoint of quantity production and maximum quietness of gear operation, to use helical teeth in the overdrive gearing. Straight teeth are, however, contemplated within the scope of the present invention.

The internal helical teeth 20 on the combination external internal or ring gear 19 mesh with external helical teeth 29 on the overdrive driven member 30 of the overdrive device. This member 30 is preferably mounted on needle-point bearings 31 on the tubular member 32 which is splined at 33 in driving connection with the shaft 7. The needle-point bearings 31 comprise two groups of small diameter pins separated endwise by an external annular rib 34 on the tubular member 32 and held endwise between this rib and shoulders 35 and 36, respectively, on the member 32. The inner periphery of the member 30 bears upon the small diameter pins which provide needle-point bearing support for the member 30.

The driven member 40 for direct drive is splined at 41 on the tubular extension 32 and is held against endwise movement to the right (Figure 1) by means of a retainer ring 42. A thrust washer 43 is interposed between the opposite end of the hub of the driven member 40 and the adjacent end of the overdrive driven member 30 to take the thrust developed between these parts by the helical gear teeth. The washer 43 is placed at this location so that it will have a low relative sliding speed as, for instance, if the internal gear has thirty-two teeth and the meshing spur gear has twenty-eight teeth, it is obvious that the unit will make seven complete revolutions before this washer gains one complete revolution on its sliding thrust face, i. e. this washer turns in accordance with the tooth difference. Interposed between the radially extending portion at the right-hand end of the member 30 and the adjacent end of the external internal gear member 19 is a thrust washer 44. The reduced end of the driven shaft 8 of the overdrive device, which reduced end is piloted in the end of the shaft 7, may be provided with a suitable bushing as indicated at 45.

The driven member 40 for direct drive is provided peripherally with external clutch teeth 48 for engagement with internal clutch teeth 49 at the left-hand end (Figure 1) of the synchronizing and clutching ring 50 when this ring is shifted to the right from neutral position as shown. These same teeth 49 are adapted to be engaged when the ring 50 is shifted to the left with external clutch teeth 51 peripherally about the radially extending portion of the overdrive driven member 30. The shaft 8 has an integral flange 52 provided peripherally with external clutch teeth 53 which engage internal clutch teeth 54 in the right-hand end of the synchronizing and clutching ring 50. A thrust washer 52' is preferably interposed between this flange 52 and the ring 42.

The teeth 54 are slidable with respect to the teeth 53 in shifting the member 50 and are of sufficient length for constant engagement with the teeth 53 when the ring 50 is in neutral position as shown, as well as when this ring is shifted to engage the teeth 49 with the teeth 51 and when said ring 50 is shifted in the opposite direction to engage the teeth 49 with the teeth 48. The teeth 54 being larger than the teeth 49 at the opposite end of the ring 50 disposes the teeth 44 in telescoping relation over the teeth 48. This is an important aspect of this form of the invention because it permits the rear bearing 56 to be brought up close to the direct drive driven member 40 and the flange 52 in compact endwise relation with respect to the member 40 without interference between the teeth 54 and the teeth 48. When the member 50 is shifted to the left to engage the teeth 49 with the teeth 51, the teeth 54 slip endwise over the teeth 48 clear of the same so that there will be no interference between these parts and, at the same time, the overlapping or telescoping arrangement materially reduces the overall length of the overdrive device and places the bearing 56 close in to provide firm support for the parts.

The outer race of the bearing 56 is seated at 57 in a bore in the cover or rearward casing part 58 which is bolted at 59 to the case 6. A suitable gasket 60 may be interposed between the case 6 and the casing part 58. The outer race of the bearing 56 is held against endwise movement to the right by the shoulder 61 and the rearward end of the shaft 8 is splined at 62 and provided with a threaded stud extension 63 for connection to the forward end of the propeller shaft by means of the usual universal joint or otherwise as suitable or desired. A worm gear 64, housed within the casing part 58 and secured to turn with the driven shaft 8 of the overdrive device by means of the splines 62, meshes with a worm member 65 for driving the speedometer mechanism of the vehicle in the usual manner. The rearward end of the casing part 58 is preferably provided with a fluid-tight oil cap or closure device, similar to that shown in Figure 9, for sealing the rear end of the casing for the overdrive gear device against the escape of lubricant which is maintained at the desired level within the casing. This oil cap or lubricant closure of course cooperates to this end with the means for connecting the splined end of the shaft 8 to the propeller shaft.

The synchronizing means comprises a synchronizing ring member 68 having internal oppositely tapered surfaces 69 and 70 for frictional engagement with corresponding inclined surfaces 71 and 72 on the overdrive driven member 30 and direct drive driven member 40, respectively. The synchronizing ring 68 may be made in the form of a bronze casting or the like, and this ring has splined driving connection with the ring 50 by means of external clutch teeth 74 which engage with the internal clutch teeth 49 of the ring 50. The spring-pressed ball members 75 of the synchronizing device move the ring 68 yieldingly with the ring 50, and, after the two parts 50, 48 or 50, 51, are synchronized by the engagement of the cone clutch surfaces 70, 72 or 69, 71, permits the ring 50 to move on past the ring 68 for engagement of the clutch teeth 49 with the clutch teeth 48 for direct drive, or engagement of the clutch teeth 49 with the clutch teeth 51 for internal gear overdrive. In the neutral position of the ring 68 as shown in Figure 1, there is preferably a slight clearance between the cone clutch surfaces 70, 72 and 69, 71.

The ball members 75, a number of which are spaced circumferentially about the ring 68, are pressed yieldingly into engagement with notches 76 in teeth 74 by coiled springs 78. The ball members 75 operate in radial openings which extend through the ring 50, and the springs 78 are held in place by cap members 79, the inner ends of which are secured in place in the enlarged outer ends of the openings through the ring 50. The ends of the notches 76 as viewed in Figure 1 are spread or diverge upwardly so that as the synchronizing ring 68 is engaged, for example, with the conical surface of the member 40 in the movement of the ring 50 to the right, continued movement of the member 50 in this direction will cause the right-hand ends of the notches 76 to cam the ball members 75 outwardly into position where they are released from the notches 76 so that the member 50 may continue its movement to engage the clutch teeth 49 with the clutch teeth 48. In shifting into internal gear overdrive, the action of the ball members 75 with the left-hand ends of the notches 76 is the same. Figure 6 shows the position of the parts after the ring 50 has been synchronized with the overdrive driven member 30 and the clutch teeth 49 engaged with the clutch teeth 51, whereas Figure 7 shows the position of the parts after the ring 50 has been synchronized with the direct drive driven member 40 and the clutch teeth 49 moved into engagement with the clutch teeth 48.

The ring member 50 is shifted in any suitable or desired manner, as by means of a shifter rod 82 slidable at one end at 83 in a suitable opening in the case 6, and at its opposite end in a bearing 84 secured at 85 to the upper portion of the casing part 58 and fitting into an opening therein. The rod 82 has a shifter arm 86 secured thereto at 87, and this shifter arm has suitable shifting engagement or cooperation at 88 with an external groove in the member 50 whereby movement of the rod 82 to the right shifts the member 50 to the right, and movement of the rod in the opposite direction shifts the member 50 in the opposite direction. Suitable provision for lubricating the speed range gear is made by an opening 90 at the top of the casing 6, and a draining plug (not shown) may be provided at the bottom. The opening 90 is provided with a cover or closure 91 removably secured in place at 92.

The top of the left-hand end of the rod 82 (Figure 1) is provided with a pair of notches 94 adapted to receive a ball member 95. This ball member 95 is at all times urged into engagement with the rod 82 by means of a coiled spring 96 disposed with the ball member 95 in an opening in the boss 97 on the top of the case 6. The spring 96 is retained in place by means of a cap screw 98 threaded into the top of the boss 97. The ball 95, by engagement with the left-hand notch 94 retains the rod 82 in the position in which the clutch teeth 49 engage the clutch teeth 48, and, by engagement in the right-hand notch 94, retains the rod 42 in the position in which the clutch teeth 49 are engaged with the clutch teeth 51. Any other suitable or preferred retention means may, of course, be employed.

While I have illustrated in the drawings a vacuum type shift device, it is to be understood that the transmissions of the present invention may be provided with mechanical or manual shift devices as suitable or desired.

The particular vacuum shift shown comprises a piston 100 secured to the shifter rod 82 and slidable in a cylinder 101 in the upper portion of the casing part 58. The rearward end of the cylinder 101 is closed by a closure plate 102 secured in place, for example, by screws 103. The piston 100 may be formed similar to the piston shown in section in the embodiment of Figure 9, or otherwise as desired.

The conduit 105 (Figure 3) is a suction conduit leading from any suitable source of suction as, for example, from the intake of the engine. This conduit 105 opens at 106 into a valve casing 107 which has a port 108 opening into a conduit 109 connected at 110 to the interior of the cylinder 101 on one side of the piston 100, and a second port 112 opening into a conduit 114 connected at 115 to the interior of the cylinder 101 on the opposite side of the piston 100. Within the casing 107 is a plunger valve 116 yieldingly seated in closed position against seat 117 by means of a coiled spring 118 interposed between the valve and a cap nut 119 threaded into the lower end of the casing 107.

The upper end of the valve stem 120 projects upwardly to be engaged by a finger 121 on the clutch pedal 122 when this pedal is operated to disengage the main engine clutch. Synchronizing shift for direct or overdrive is thereby prevented with the main engine clutch engaged. When the pedal 122 is operated to disengage the engine clutch, the finger 121 strikes the valve stem 120 and opens the valve 116 for application of suction to the piston 100 as predetermined by a valve 124.

The valve 124 is rotatable in the casing 107 and has a port 125 and vent ports 230 and 231 opening therethrough. Vent ports 230 and 231 are connected to a common port 232 extending axially through valve 124 and open to the atmosphere at its outer extremity. This valve 124 is controlled by a handle 126 mounted, for example, in suitable position upon the instrument board 127 of the car for convenient access from the driver's position. The handle 126 is swingable about the axis 128 and has a connected arm 129 which may be connected in any suitable manner, as by means of a link or rod connection shown more or less diagrammatically at 30, to an arm 131 on the valve plug 124. "High" and "low" positions of the handle 126 may be marked, as shown in Figure 4, upon a suitable plate 134 attached to the instrument board.

When the handle 126 is in the position shown in Figure 4, the valve 124 is positioned with port 125 in register with the port 108 and port 112 vented through ports 231 and 232, so that when the clutch pedal 122 is depressed to disengage the main engine clutch, the finger 121 strikes the stem 120, thereby opening the valve 116 and applying suction through the ports 125 and 108 and the conduit 109 to the interior of the cylinder 101 on the right-hand side of the piston. This suction draws the piston 100 to the right, Figure 1, and shifts the overdrive gear device into direct drive by engaging the clutch teeth 49 with the clutch teeth 48. When the handle 126 is moved to "high" position, as indicated in dotted lines in Figure 4, the valve 124 is moved into position with the port 125 in registration with the port 112 and port 108 vented through ports 230 and 232 so that, when the clutch pedal 122 is depressed, suction is applied to the opposite side of the piston 100 to shift the synchronizing and clutching ring 50 into position to engage the clutch teeth 49 with the clutch teeth 51 for internal overdrive. The connection of either port 108 and 112 to the suction conduit is accompanied simultaneously by the connection of the other port to the atmosphere through 124, thereby insuring an operative difference of pressure on the sides of piston 100.

It is believed that the operation of the device will be apparent from the foregoing description. The usual accelerating and reverse function is secured through the transmission housed within the case 5, and the application of the reference character 5 to this gear case is intended to indicate the usual or any preferred type accelerating and reverse gear which may, of course, vary widely within the scope of the present invention. With the handle 126 in the position shown in Figure 4 to set the valve 124 for positioning the synchronizing and clutch ring 50 with the teeth 49 in engagement with the teeth 48 of the direct drive driven member of the overdrive device, the usual accelerating and reverse ratios are obtainable through the accelerating and reverse gear mechanism within the case 5 in the usual or any preferred manner.

In order to obtain the internal gear overdrive, the handle 126 is moved to the position shown in dotted lines in Figure 4, with the gearing of the transmission 5 in direct drive relation, and then, by operation of the clutch pedal to disengage the clutch, suction is applied to shift the synchronizing and clutch ring 50 to the left (Figure 1) to engage the clutch teeth 49 with the clutch teeth 51 of the overdrive driven member 50. With the transmission 5 in direct drive relation, the shaft 7 is driven at engine speed, driving the external internal gear member 19 through the meshing engagement of the internal teeth 17 of the gear 9 with the external teeth 18 of the ring gear 19. The gear member 19 is thereby turned at a speed in excess of the speed of the shaft 7, depending upon the ratio of the gear teeth 17 and 18, and this rotation of the gear member 19 is transmitted through the meshing engagement of the internal teeth at the opposite end thereof with the external teeth 29 of the overdrive driven member 30. This member 30 is thereby rotated at a speed in excess of the speed of the gear member 19, depending upon the ratio between the internal teeth 20 and the meshing external teeth 29. The overdrive thus produced is transmitted through the cooperating clutch teeth 51, 49 to the synchronizing and clutching ring 50, and from this ring 50 through the meshing clutch teeth 54 and 53 to the driven shaft 8 of the overdrive, and from this shaft to the propeller shaft of the vehicle.

The rearward end of the tubular member 32 is supported by needle-point bearings 140 which bear upon the shaft 8 just forwardly of the radial flange 52 and substantially in the transverse plane of the meshing clutch teeth 49, 74, and also substantially in the transverse plane of the clutch teeth 48 of the direct drive driven member of the overdrive device. These needle-point bearings, like the needle-point bearings previously described, comprise a plurality of small diameter rollers or pins arranged circumferentially between the external periphery of the shaft 8 and the internal periphery of the rearward end of the tubular member 32. The small diameter rollers constituting these needle-point bearings 140 are retained against endwise displacement by annular shoulders 141 and 142 on the shaft 8.

The bearing 21 for the external internal gear 19 is disposed externally of this gear and in transverse alignment with the meshing teeth 20 and 29. The bearing 11 is in close proximity to the transverse plane of the meshing teeth 17 and 18, and the rear bearing 56, as already pointed out, is up close to the direct drive driven member 40. A simple, compact and strong device is thus provided in which all parts are admirably supported throughout. The length of the overdrive device in particular is short for use between the usual accelerating and reverse gearing and the propeller shaft, even where the available space at this position is relatively restricted.

Figure 9:
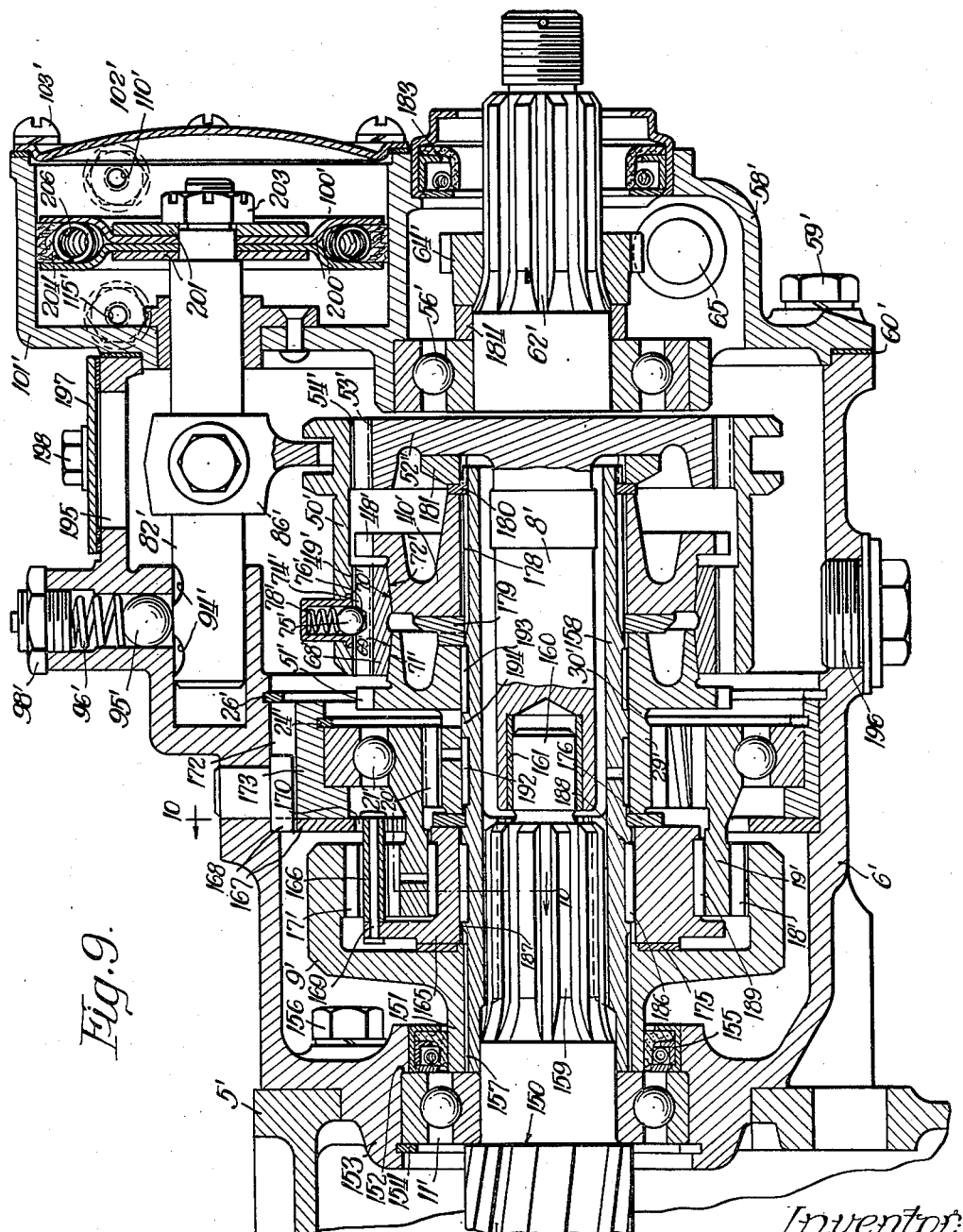
Figure 9 is a longitudinal sectional view of another form of transmission embodying the present invention.

The device shown in Figure 9 is substantially the same as the device shown in Figure 1 except that the internal gear overdrive and bearing mounting are made to fit a standard type car transmission already manufactured. This overdrive device uses the same bearing 11' employed in the standard type car transmission with which the overdrive device is adapted to be employed instead of requiring a larger bearing as in the previous embodiment.

In this case, the bearing 11' directly supports the reduced rear end of the shaft 7', which is the usual driven shaft of the usual standard accelerating and reverse gear 5'. The inner race of the bearing 11' is held endwise between the shoulder 150 on the shaft 7' and the forward end of the hub 151 of the internal gear 9'. The outer race of this bearing is held endwise between a shoulder 152 in the hub 153 of the overdrive gear case 6' and a retainer ring 154 similar to the retainer ring described in connection with the previous embodiment of the invention. An oil retainer ring of existing or preferred form is provided at 155 and the overdrive gear case 6' is bolted at 156 to the case of the accelerating and reverse gear transmission 5'.

The internal gear 9' is splined at 157 upon a tubular drive member 158, and rearwardly of the bearing 11' the reduced end of the shaft 7' is splined at 159 into the tubular member 158. Rearwardly of the splined engagement of the shaft 7 with the member 158, this shaft 7 is further reduced, and this reduced end is piloted at 160 into the forward end of the driven shaft 8' of the overdrive device. A suitable bushing may be provided at 161.

The internal teeth 17' of the gear 9', which are preferably helical because of the advantages in quantity production and maximum quietness of gear operation, although they may be straight if desired, mesh with corresponding external teeth 18' on the external internal gear ring 19'. The opposite end of the gear ring 19' is provided with internal teeth 20' which are likewise preferably helical, although this may be varied, and these internal teeth 20' mesh with corresponding external teeth 29' on the overdrive driven member 30'.

Figure 10:
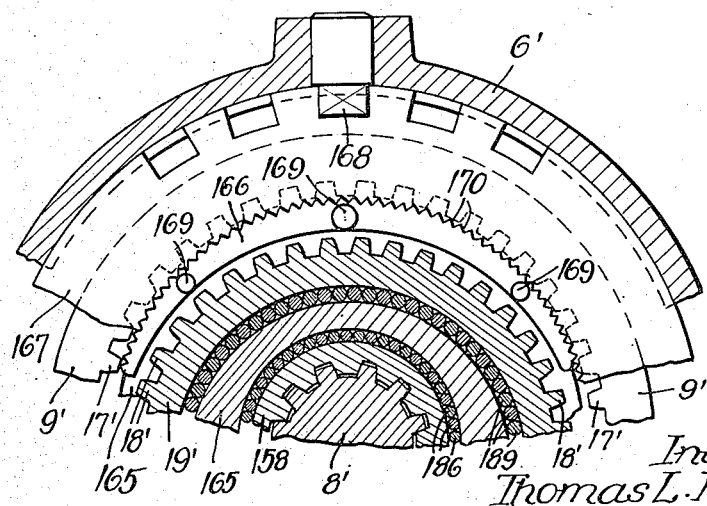
Figure 10 is a fragmentary transverse section taken on the line 10—10 of Figure 9.

The member 165 is a stationary bearing member for eccentrically supporting the composite gear 19' and held against rotation by a crescent-shaped member 166 shown in Figures 9 and 10. This crescent-shaped member 166 is, in turn, held against rotation by a stamping 167 locked to the housing or case 6' by means of the key 168. The crescent-shaped member 166 is connected as by means of rivets 169 to the flange on the member 165, and the opposite end of this crescent-shaped member is toothed at 170 for engagement with corresponding teeth internally of the stamping 167.

The key 168 has the square head at its inner end for locking the stamping 167 to the housing, and the outer end of this key is turned round to fit in an opening in the case 6' as shown. This key permits pulling the member 167 out without disturbing the crescent-shaped member 166. The square inner end of the key also engages in a slot 172 in the eccentric bearing retainer ring 173 which corresponds to the eccentric bearing retainer ring 22 of the previous embodiment. This bearing retainer ring 173 supports the bearing 21' which is disposed externally of and supports the external internal gear member 30' in substantially transverse alignment with the meshing teeth 20' and 29'. Retainer rings 24' and 26' hold the outer race of the bearing 21' and the retainer ring 173, respectively, against endwise movement rearwardly under the thrust developed by the helical gear teeth. Thrust washers 175 and 176 are interposed between the internal gear member 9' and the member 165 and between the opposite end of the member 165 and the forward end of the overdrive driven member 30'.

As in the previous embodiment of the invention, the driving shaft reaches or extends axially through the internal gear 9' and through the cooperating external internal gear 19' and has splined at 178, upon the rearward end of the tubular member 158, the direct drive driven member 40' of the overdrive device. This member 40' has the peripheral clutch teeth 48' and the conical synchronizing surface 72'. The overdrive driven member 30' has the radially extending portion provided peripherally with clutch teeth 51', and this member 30' has the conical synchronizing surface 71'. A thrust washer 179 is interposed between the members 30' and 40'.

The synchronizing ring 68' is similar to the corresponding synchronizing ring of the previous embodiment, and has conical synchronizing surfaces 69' and 70' for cooperation with the surfaces 71' and 72', respectively. This ring 68' has external clutch teeth which mesh with internal clutch teeth 49 on the synchronizing and clutching ring 50', which ring 50' has, at its opposite end, internal clutch teeth 54' which mesh with external clutch teeth 53' about the periphery of the radially extending torsional flange 52" integral with the driven shaft 8' of the overdrive device. The member 40' is held against endwise movement to the right (Figure 9) by a retainer ring 180, and a thrust washer 181 is interposed between this ring and the flange 52" on the driven shaft 8'.

In this case, the internal teeth 49' and 54' are of substantially the same diameter without the telescoping arrangement of the preceding embodiment, and, as a result, the spacing of the bearing 56' from the member 40' is somewhat greater than in the preceding embodiment in order to permit the teeth 49' to be shifted into engagement with the teeth 51' without interference between the teeth 54' and the teeth 48'. The bearing 56' is mounted in the casing part 58' which is bolted at 59' to the case 6', preferably with an intervening gasket 60' interposed between the casing parts. An oil or lubricant retainer ring is provided at 183, and splined at 62' upon the shaft 8' is a worm gear 64' which drives a worm 65' for a speedometer drive or the like. A thrust washer 184 is interposed between the inner race of the bearing 56' and the worm gear 64' similar to the thrust washer 184' in the previous embodiment.

The tubular driving member 158 is rotatably journaled in the stationary bearing member 165, preferably by means of needle-point bearings 186 comprising, as previously described, small diameter rollers or pins held endwise between shoulders 187 and 188 on the tubular member 158. The external internal gear member 19' is supported in the transverse plane of the meshing teeth 17' and 18' by needle-point bearings 189, comprising small diameter rollers or pins arranged circumferentially between the inner periphery of the gear member 19' and the external periphery of the bearing member 165.

The overdrive driven member 30' is supported internally and in the transverse plane of the meshing teeth 20' and 29' by needle-point bearings 192, and this member 30' is further supported by a second series of needle-point bearings 193 in substantially the transverse plane of the clutch teeth 51 and the synchronizing cone surface 71'. These needle-point bearings 192 and 193 are separated endwise by an annular rib 194 on the tubular member 158 and are held by external shoulders on this member 158 at the opposite ends of the respective bearings.

As in the previous embodiment, suitable provision for lubricating the speed range or overdrive gear is made by an opening 195 at the top of the case 6', and a drain plug 196 may be provided at the bottom. The opening 195 is provided with a cover or closure 197 removably secured in place at 198.

The synchronizing and clutching ring 50' is shifted, as in the preceding embodiment, by means of a shifter rod 82' having an arm 86' in shifting cooperation with the annular external groove in the ring 50'. The rod 82' is held in overdrive position with the clutch teeth 49' shifted forwardly into engagement with the clutch teeth 51' of the overdrive driven member 30' by engagement of the ball member 95' in a notch 94', and this rod 82' is held in direct drive position of the overdrive device, i. e. in position with the clutch teeth 49' in engagement with the clutch teeth 48' of the direct drive driven member 40' by engagement of the ball member 95' in a second notch 94'. The coiled spring 96' and the cap screw 98' are similar to the preceding embodiment.

This embodiment of the invention may be operated mechanically or manually instead of by means of the vacuum type shift shown. This vacuum shift means is similar to the vacuum shift means shown in the preceding embodiment, and corresponding parts are indicated by primed reference characters corresponding to the reference characters in Figure 1.

The piston 100' as shown in section in this figure comprises a pair of metal stampings 200 spread apart at their margins and clamped centrally between discs 201 which are, in turn, clamped between a shoulder on the shaft 82' and a suitable nut 203. An expanding ring 204 of suitable material, such as leather or the like, is held between the spread margins of the stampings 200 and is pressed outwardly into tight engagement with the inner wall of the cylinder 101' by means of a coiled garter spring 206 arranged annularly between the spread margins of the stampings 200 and disposed within the ring 204.

The central eccentric bearing member 165 takes the driving action of the first internal gear member, and by its disposition in transverse alignment with the meshing teeth 17' and 18' and the arrangement of the bearing 21' externally about the opposite end of the external internal ring gear 19' and the disposition of the bearing 56' together with the needle-point bearings described, provides admirable support throughout.

Ball members 75', pressed into notches 76' by coiled springs 78' as in the previous embodiment of the invention, yieldingly connect the synchronizing rings 68' to the synchronizing and clutching ring 50' so that the conical surfaces of the ring 68' will be brought into synchronizing engagement with the conical surfaces of the members 30' and 40', and thereupon the ring 50' may move on past the ring 68' to engage the teeth 49' with the teeth 51' or 48'.

The operation of the embodiment of Figure 9 is substantially the same as the operation of the previous embodiment. The usual accelerating and reverse function is secured through the transmission 5', and the internal gear overdrive is secured in the overdrive transmission 6'.

With the clutch teeth 49' of the synchronizing and clutching ring 50' shifted rearwardly into engagement with the clutch teeth 48' of the overdrive driven member 30', the usual accelerating and reverse speeds, as well as direct drive, may be obtained from the transmission 5', and thence through the shaft 7', tubular driving member 158, direct drive member 40', synchronizing and clutching ring 50', meshing teeth 54' and 53', radial extension or annular flange 52", and driven shaft 8', to the propeller shaft to which the driven shaft 8' is connected. With the accelerating and reverse gear transmission 5' in direct drive and the clutch teeth 49' of the synchronizing and clutching ring 50' in engagement with the clutch teeth 51' of the overdrive driven member 30', an internal gear overdrive is transmitted from the shaft 7' through the internal gear 9', external internal gear 19', overdrive driven member 30', synchronizing and clutching ring 50', meshing teeth 54' and 53', to the overdrive driven shaft to impart an internal gear overdrive to the propeller shaft.

Figure 11:
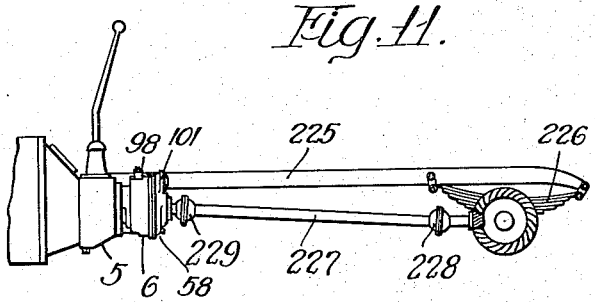
Figure 11 is a diagrammatic view illustrating the relation of the overdrive gear set with respect to the accelerating and reverse gear set and the rear axle.

The frame of the vehicle upon which the transmission gear sets 5 and 6, for example, are mounted, is indicated at 225 in Figure 11, and this frame 225 is spring-supported upon the rear axle by means of the spring 226, it being understood that this spring supporting arrangement for the frame usually is duplicated at each side of the vehicle and may, of course, vary as desired. The propeller shaft is indicated at 227 and may be enclosed. This shaft has driving connection with the rear axle, as through a universal joint 228, and its opposite end has driving connection with the driven shaft 8, for example, of the internal gear overdrive by means of a universal joint 229.

I have described the invention in connection with the details of particular embodiments, but I do not intend thereby to limit the invention to such details, nor do I intend to be limited to the particular embodiment and relation of the essential features shown and described.

I claim:

1. A gear set for motor vehicles having, in combination, an internal gear, a composite gear having external teeth meshing with the internal teeth of said internal gear, a first driven member having external teeth meshing with the internal teeth of said composite gear, a first shaft fixed to said internal gear and having an extension extending through said internal gear, said composite gear and said first driven member, a bearing supporting the composite gear and located externally of the composite gear and in radial alignment with the internal teeth of said composite gear, bearing means carried by the extension of said first shaft and supporting said first driven member, said last bearing means being located internally of said first driven member and in radial alignment with the external teeth of the first driven member, a second driven member fixed on the extending end of the extension of said first shaft, a second shaft, and means for connecting said first and second driven members selectively to said second shaft.

2. In combination, a driving shaft, a driven shaft, a radially extending part on one of said shafts, a clutch member for the other shaft, external clutch teeth on said clutch member, and a shiftable clutching ring having internal clutch teeth shiftable into and out of engagement with the clutch teeth on said clutch member, said shiftable clutch ring having internal splines in sliding engagement with external splines on said radially extending part, the internal splines on said shiftable clutch ring being operable telescopically over and clear of meshing engagement with the external clutch teeth on said clutch member.

3. A gear set for motor vehicles having, in combination, an internal gear, a composite gear having external teeth meshing with the internal teeth of said internal gear, a first driven member having external teeth meshing with the internal teeth on said composite gear, a shaft fixed to said internal gear and having an extension extending through said internal gear, said composite gear and said first driven member, a second driven member fixed on the extending end of the extension of said shaft, a second shaft, a radially extending part on said second shaft, clutch teeth on the periphery of said part, clutch teeth on said first driven member, clutch teeth on said second driven member, a clutching ring having clutch teeth in permanent engagement with the clutch teeth on the radially extending part on said second shaft and clutch teeth shiftable into engagement selectively with the clutch teeth on the respective driven members, and synchronizing means on said clutching ring and on said driven members for synchronizing said ring with respect to the respective driven members ahead of engagement of the clutch teeth of said ring with the clutch teeth of the respective driven members.

4. A gear set for motor vehicles having, in combination, an internal gear, a composite gear having external teeth meshing with the internal teeth of said internal gear, a first driven member having external teeth meshing with the internal teeth on said composite gear, a shaft fixed to said internal gear and having an extension extending through said internal gear, said composite gear and said first driven member, a second driven member fixed on the extending end of the extension of said shaft, a second shaft, a radially extending part on said second shaft, clutch teeth on the periphery of said part, clutch teeth on said first driven member, clutch teeth on said second driven member, a clutching ring having clutch teeth in permanent engagement with the clutch teeth on the radially extending part on said second shaft and clutch teeth shiftable into engagement selectively with the clutch teeth on the respective driven members, and synchronizing means on said clutching ring and on said driven members for synchronizing said ring with respect to the respective driven members ahead of engagement of the clutch teeth of said ring with the clutch teeth of the respective driven members, said synchronizing means comprising oppositely conical surfaces on said driven members and oppositely conical surfaces internally of said ring and at opposite ends thereof.

5. A gear set for motor vehicles having, in combination, an internal gear, a composite gear having external teeth meshing with the internal teeth of said internal gear, a first driven member having external teeth meshing with the internal teeth of said composite gear, a first shaft fixed to said internal gear and having an extension extending through said internal gear, said composite gear and said first driven member, bearing means carried by the extension of said shaft and supporting said composite gear, said bearing means being located internally of said composite gear and in radial alignment with the external teeth of said composite gear, bearing means carried by the extension of said shaft and supporting said first driven member, said last bearing means being located internally of said first driven member, a second driven member fixed on the extending end of the extension of said first shaft, a second shaft, and means for connecting said first and second driven members selectively into said second shaft.

6. In a gearing, a casing, an internal gear, a composite gear having external teeth meshing with the internal teeth of said internal gear, a driven member having external teeth meshing with the internal teeth on said composite gear, a shaft fixed to said internal gear and having an extension extending through said internal gear, said composite gear and said first driven member, and a bearing member mounted on the extension of said shaft and having a hub with an external eccentric periphery for supporting the composite gear internally and on the extension of said shaft and with its axis in eccentric relation to said internal gear.

7. In a gearing, a casing, an internal gear, a composite gear having external teeth meshing with the internal teeth of said internal gear, a driven member having external teeth meshing with the internal teeth on said composite gear, a shaft fixed to said internal gear and having an extension extending through said internal gear, said composite gear and said first driven member, a bearing member mounted on the extension of said shaft and having a hub with an external eccentric periphery for supporting the composite gear internally and on the extension of said shaft with its axis in eccentric relation to said internal gear, and means secured to the casing and connected to said bearing member for holding said bearing member against rotation.

8. In a gearing, a casing, an internal gear, a composite gear having external teeth meshing with the internal teeth of said internal gear, a driven member having external teeth meshing with the internal teeth on said composite gear, a shaft fixed to said internal gear and having an extension extending through said internal gear, said composite gear and said first driven member, a bearing member mounted on the extension of said shaft and having a hub with an external eccentric periphery for supporting the composite gear internally and on the extension of said shaft with its axis in eccentric relation to said internal gear, a flange on said bearing member, a crescent-shaped member secured to said flange and disposed between the internal teeth of the internal gear and the external teeth of the composite gear, a member locked to the housing and having a toothed portion, and a toothed portion on said crescent-shaped member for engagement with said first toothed portion to hold said bearing member against rotation.

9. In a gearing, a casing, an internal gear, a composite gear having external teeth meshing with the internal teeth of said internal gear, a driven member having external teeth meshing with the internal teeth on said composite gear, a shaft fixed to said internal gear and having an extension extending through said internal gear, said composite gear and said first driven member, a bearing member mounted on the extension of said shaft and having a hub with an external eccentric periphery for supporting the composite gear with its axis in eccentric relation to said internal gear, a flange on said bearing member, a crescent-shaped member secured to said flange and disposed between the internal teeth of the internal gear and the external teeth of the composite gear, a member having a toothed portion, a toothed portion on said crescent-shaped member for engagement with said first toothed portion to hold said bearing member against rotation, a bearing externally surrounding said composite gear and including a race member, and a key member locking said race member and the member having said first toothed portion to the housing and permitting said last member to be pulled out without disturbing the crescent-shaped member.

10. A gear set comprising an internal gear, a shaft fixed to said internal gear, a composite gear having external teeth meshing with the internal teeth of said internal gear and internal teeth, a first driven member having external teeth meshing with the internal teeth of said composite gear, said shaft having an extension extending through said internal gear, said composite gear and said first driven member, a second driven member splined upon the extending end of said shaft, a driven shaft having a radially extending part, conical synchronizing surfaces on said driven members, a synchronizing ring having cooperating synchronizing surfaces, clutch teeth on said first and second driven members, and a clutching ring yieldingly connected to said synchronizing ring, said clutching ring having splined engagement with the radially extending part on the driven shaft and having clutch teeth for engagement selectively with the clutch teeth on said first and second driven members, said clutching ring shifting the synchronizing ring into cooperation with the synchronizing surfaces of the respective driven members to synchronize the clutch ring and said members ahead of clutching engagement therewith.

11. In combination, a driving shaft, an internal gear fixed to said shaft, a composite gear having external teeth meshing with the internal teeth of said internal gear, a first driven member having external teeth meshing with the internal teeth of said composite gear, a second driven member fixed to the driving shaft, a driven shaft, a splined part on said driven shaft, synchronizing and positive clutch means on said first and second driven members, a synchronizing ring having synchronizing means for engagement with the synchronizing means on said driven members, and a shiftable clutch ring having splined engagement with the splined part on said driven shaft and yieldingly connected to said synchronizing ring whereby to operate the synchronizing ring by the operation of the clutch ring, said clutch ring having positive clutch means for engagement selectively with the positive clutch means on said driven members.

12. In combination, a driving shaft, an internal gear fixed to said shaft, a composite gear having external teeth meshing with the internal teeth of said internal gear, a first driven member having external teeth meshing with the internal teeth of said composite gear, a second driven member fixed to the driving shaft, a driven shaft, a splined part on said driven shaft, synchronizing and positive clutch means on said first and second driven members, a synchronizing ring having synchronizing means for engagement with the synchronizing means on said driven members, and a clutching ring having splined engagement with the splined part on the driven shaft and splined engagement with said synchronizing ring, said clutching ring having positive clutch means for engagement selectively with the positive clutch means on said driven members.

13. In combination, a driving shaft, an internal gear fixed to said shaft, a composite gear having external teeth meshing with the internal teeth of said internal gear, a first driven member having external teeth meshing with the internal teeth of said composite gear, a second driven member fixed to the driving shaft, a driven shaft, a splined part on said driven shaft, synchronizing and positive clutch means on said first and second driven members, a synchronizing ring having synchronizing means for engagement with the synchronizing means on said driven members, and a shiftable clutch ring having splined engagement with the splined part on said driven shaft and yieldingly connected to said synchronizing ring whereby to operate said synchronizing ring by the operation of the clutch ring, said clutch ring having positive clutch means for engagement selectively with the positive clutch means on said driven members, said synchronizing ring being disposed in proximity the adjacent ends of said driven members and between the positive clutch means on said driven members.

14. A gear set comprising an internal gear, a composite gear having external teeth meshing with the internal teeth of said internal gear, a first driven member having external teeth meshing with the internal teeth on said composite gear, a shaft fixed to said internal gear and having an extension extending through said internal gear, said composite gear and said first driven member, a second driven member fixed on the extending end of the extension of said shaft, a second shaft, a bearing for said second shaft, a radially extending part on said second shaft, external splines on the periphery of said part, external clutch teeth on said first driven member, external clutch teeth on said second driven member, the clutch teeth on said first and second driven members being of substantially the same size, and a shiftable clutching ring having a single set of internal clutch teeth shiftable into engagement selectively with the clutch teeth on the respective driven members.

THOMAS L. FAWICK.